United States Patent [19]

Lagarde et al.

[11] 4,117,584
[45] Oct. 3, 1978

[54] METHOD OF MANUFACTURING AN IMPROVED CONDUIT FOR CONVEYANCE OF HOT FLUID

[75] Inventors: Pierre Lagarde, Versailles; Gaston Denoor, Grenoble, both of France

[73] Assignee: Metalimphy & B.V.S., Paris, France

[21] Appl. No.: 785,214

[22] Filed: Apr. 6, 1977

[30] Foreign Application Priority Data

Apr. 13, 1976 [FR] France .............. 76 10760

[51] Int. Cl.² .......................... B21D 39/00
[52] U.S. Cl. .................... 29/452; 138/144; 285/187
[58] Field of Search .......... 29/446, 452; 285/187; 138/144; 61/105

[56] References Cited

U.S. PATENT DOCUMENTS

| | | | |
|---|---|---|---|
| 2,335,038 | 11/1943 | Bridges | 29/452 UX |
| 2,373,038 | 4/1945 | Lindsay | 29/452 |
| 3,078,561 | 2/1963 | Szulc | 29/452 |
| 3,246,394 | 4/1966 | Meyer | 29/446 |
| 3,377,757 | 4/1968 | Magers | 29/452 X |
| 3,630,038 | 12/1971 | Ando | 61/105 |
| 3,788,083 | 1/1974 | Lundgren | 61/105 |
| 3,810,491 | 5/1974 | Hildebrandt | 29/446 X |
| 3,932,922 | 1/1976 | Thastrup | 29/446 X |

*Primary Examiner*—Charlie T. Moon
*Attorney, Agent, or Firm*—Haseltine, Lake & Waters

[57] ABSTRACT

A conduit for conveyance of hot fluids includes an inner tube, through which the fluid passes, made of a material having a low coefficient of thermal expansion, preferably less than $5 \times 10^{-6}$ per ° C and advantageously INVAR Ⓣ with a coefficient of $2.3 \times 10^{-6}$/° C. The inner tube is anchored at its ends and has no expansion-compensating means in its length is surrounded by a binding wrapping of a material having a coefficient of thermal expansion greater than that of the inner tube, prestressed at the temperature of application to compensate for the relaxation of stress in the wrapping due to the different expansions of inner tube and wrapping, and so as to compensate at least in part for changes in stress on the inner tube resulting from the absence of expansion-compensating means. A longitudinal tensile pre-stress may also be applied. The assembly also includes thermal insulation, disposed either outside the wrapping or between the wrapping and the inner tube. An outer protective coating may constitute the binding wrapping.

2 Claims, 4 Drawing Figures

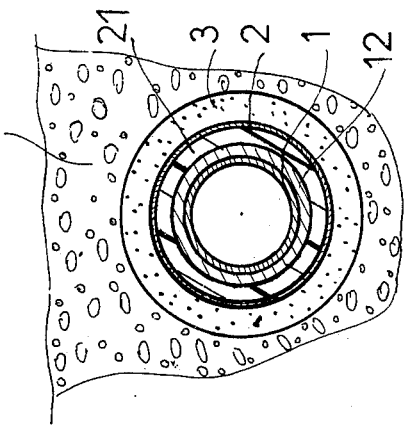
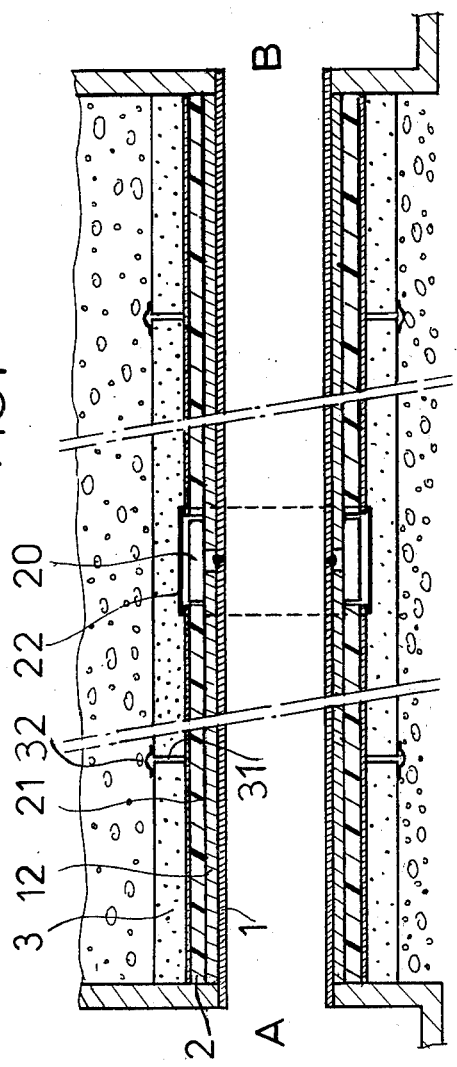
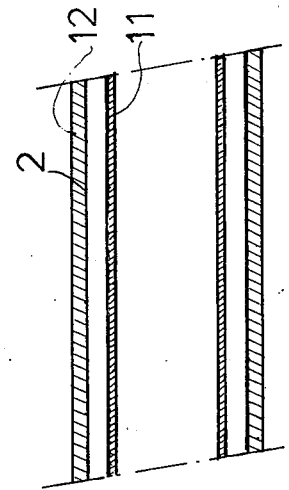
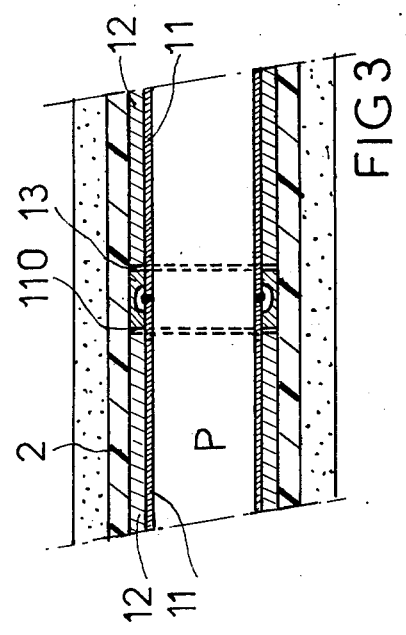

4,117,584

METHOD OF MANUFACTURING AN IMPROVED CONDUIT FOR CONVEYANCE OF HOT FLUID

FIELD OF THE INVENTION

This invention relates to a method of manufacturing a conduit for the conveyance of a fluid at a temperature above the ambient temperature.

The invention is especially suitable for application in the construction of conduits of large dimensions for the conveyance of hot fluid such as steam or water superheated to a temperature of the order of 200° C, especially for urban heating.

DESCRIPTION OF THE PRIOR ART

In the construction of conduits for the conveyance of fluids at a temperature of possibly up to 250° C it is obviously necessary to take into consideration the effect of the increase in temperature upon the conduit. It is generally necessary, in order to absorb the thermal deformations, to make use of flexible members such as bellows or expansion joints, or even to provide in the conduit expansion-absorbing sections of special form, such as lyre-shaped or S-shaped sections (expansion bends). Expansion bellows are expensive and expansion joints may be subject to leakage and for this reason demand continuous maintenance, surveillance and the provision of blow-down valves.

The problem of conveying hot fluid arises especially in urban heating. In such conditions conduits of large dimensions are used, the diameter of which may exceed one meter, in which circulates hot water or steam at a temperature often in the range of 200°–250° C. Up to the present these conduits, because of their large diameter, have been constructed of ordinary steel and, in order to absorb the thermal deformations, there have been disposed at suitable intervals expansion bends of lyre- or S-shape, or compensators. A serious disadvantage is that such expansion bends require suitably large emplacements. On the other hand it is necessary for the conduits to be able to move, and they must therefore be mounted on sliding, rolling or compensated supports allowing their expansion. The conduits must therefore be installed above ground, or in urban locations, in galleries or troughs. As it is necessary to monitor the tightness of the expansion means it becomes very difficult to install urban heating in some locations because of the magnitude of the civil engineering works required, possible compulsory aquisitions, and of the constraints imposed on the circulation, the cost of installation and conduits thus becoming excessive.

It is true that it has already been proposed to bury the conduit directly in the earth, but it is then necessary to take care that the thermal insulation does not absorb humidity which will in the long term result in the deterioration of the conduit.

The conduit is therefore often surrounded by a protective sheath, but it is not easy to seal this sheath sufficiently well because of the movements of the conduit due to expansion. It is therefore necessary to protect the thermal insulation against damp or to ensure its draining by means of somewhat complex and costly arrangements. In addition the inner tube must in any case be provided with means for compensating expansion. As these means are subject to pressure when in service, it is necessary to be able to examine their condition and they are therefore placed in trenches. This difficulty is thus not overcome. In addition, the conduit moves with respect to the sheath as a result of the expansion and this displacement makes sealing more difficult and may in the long term give rise to deterioration of the thermal insulation interposed between the sheath and the conduit.

SUMMARY OF THE INVENTION

It is an object of the invention to overcome these difficulties by allowing the construction of underground conduits buried directly in the ground over the whole of their length without the interposition of expansion-compensating means.

According to the present invention there is provided a method of manufacturing a conduit for the transport of hot fluid, constituted by an inner tube surrounded by thermal insulation and by a protective sheath, wherein the inner tube is formed of a material having a very low coefficient of expansion under its working conditions and is reinforced by a reinforcing sheath of a material having appreciable thermal expansion, the reinforcing sheath being prestressed at the temperature at which it is applied to the inner tube and that the inner tube is anchored at least at its two ends and does not include any expansion-compensating means, the difference between the coefficients of expansion of the inner tube and of the reinforcing envelope and the amount of prestress of the reinforcement at the temperature at which it is applied being such as to compensate on the one hand for the reduction in binding stress when in use due to the different expansions of the tube and of the sheath and to compensate at least in part for the compressive stresses resulting from the absence of expansion compensating means owing to the contraction effect due to the reduction of the binding forces.

BRIEF DESCRIPTION OF THE DRAWINGS

The invention will now be described with reference to a particular manner of construction given by way of example and represented in the accompanying drawings, in which:

FIG. 1 is a longitudinal sectional view of a conduit in accordance with the invention;

FIG. 2 is a cross-section of the same conduit;

FIG. 3 is a longitudinal sectional view of a modified embodiment; and

FIG. 4 is a longitudinal sectional view of another modification.

DETAILED DESCRIPTION

FIG. 1 shows in longitudinal section a conduit for transporting a hot fluid from an upstream chamber A to a downstream chamber B. The conduit is composed of a continuous tube of a material having a very low coefficient of thermal expansion, preferably having a coefficient of thermal expansion that does not exceed $5 \times 10^{-6}$ per ° C, for example a tube of an iron-nickel-carbon alloy of the kind known under the trade mark "INVAR" made by one of the applicant companies and this tube is anchored at its ends to the walls of the chambers A and B and thus has a fixed length.

The tube 1 is surrounded by a reinforcing sleeve 12, covered in turn by thermal insulation 2. The assembly is placed in a protective sheath 3 which will generally be of lightly reinforced concrete.

As has been stated, hitherto known conduits for the transport of hot fluid include expansion-compensating means. These means, disposed in the inner tube, are subjected to pressure when in service. They may therefore be subject to leaks and it is essential to be able to gain access to them. They must therefore be placed in accessible trenches. On the other hand, as has been seen, the conduit must be able to move and it is therefore generally situated in a trough. The use of an alloy of the INVAR type, the mean coefficient of thermal expansion of which between 0° and 200° C is only $2.3 \times 10^{-6}$ allows these arrangements to be dispensed with.

It has already been proposed to construct conduits of an alloy of low thermal expansion, but only for the conveyance of liquified gas, that is to say, at low temperatures. In this case the inner tube has a tendency to contract and in consequence to become stressed in tension if its extremities are anchored and means for compensating variations in length are absent. In a conduit of great length the effect of an expansion is much more damaging than that of a contraction for while the tube may withstand a relatively high stress in longitudinal tension as a reuult of its mechanical characteristics, expansion puts the tube in compression and introduces the risk of its buckling, especially if the conduit is buried and in consequence subjected to external influences which may increase the risk of buckling. This is why the concept of using INVAR for fluid transport at low temperature would not normally be transposable to fluid transport at high temperatures.

On the other hand the transport of fluids at low temperature requires the use of special steels such as those containing 9% nickel, while conduits used for the transport of steam at 200° C, particularly for urban heating, have, up to the present, been constructed of ordinary steel. In consequence, the use of a low-expansion alloy would necessitate a greater increase in cost for the transport of hot fluids and this also may be a reason why this application of INVAR has not hitherto been considered.

But the particular arrangements in accordance with the invention make the use of an alloy of low coefficient of thermal expansion both technically and economically feasible.

A first of these arrangements consists in the use of a binding wrapping. This latter immediately permits the thickness of the inner tube of low thermal expansion steel, and in consequence the cost of the conduit, to be reduced, but the wrapping also gives a new advantage unique to the invention.

In practice, the binding wrapping is formed of an ordinary steel and it is placed in the inner tube at ambient temperature. In consequence, when the conduit is put in service, at a temperature of the order of 200° C, the binding wrapping expands more than the tube and its binding effect is reduced. In accordance with the invention, the binding wrapping is applied at the ambient temperature under a prestressing tension higher than the reinforcing tension needed to resist the service pressure by an amount sufficient to compensate for the reduction in the reinforcing effect due to the different thermal expansions of the inner tube and the reinforcing sleeve. In this manner the efficacy of the wrapping is retained.

But this prestressing tension has another advantage. In practice the inner tube, thus circumferentially compressed, will increase in length elastically by an amount which will depend on the Poisson coefficient. When the temperature rises and the circumferential compression is reduced, this elongation will likewise lessen. It is found that for an alloy of which the coefficient of thermal expansion is small, less than $5 \times 10^{-6}$ for example, and the mechanical characteristics are good, the circumferential compression which must be applied when cold results in an elongation comparable with that which results from the increase in temperature when in service. As a result, the circumferential compression exerted on the tube diminishes in proportion to the increase in temperature and is replaced by a tension resulting from the increase in internal pressure, when the conduit is put in service.

The initial elongation obtained by the prestressed reinforcement thus disappears and this effect of diminution in length to which is added the Poisson effect due to the increase in pressure compensates at least in part for the increase in length due to the longitudinal thermal expansions so that it becomes possible to reduce or even to cancel the compressive constraints resulting from the thermal expansion. The risk of buckling may thus be practically eliminated.

If the compression constraints continue it is likewise possible to apply a longitudinal pre-stress to the inner tube. It is possible for example to construct a tube slightly shorter than the distance between abutments, to fix to its end by any suitable means jacks bearing on the anchoring abutment, to exert on the tube the pre-stress producing its elongation, and then to fix the end to the anchoring abutment, the jacks then being removed. As the temperature increases the tube will expand and the tensional constraints will diminish. It is thus possible to add this effect of longitudinal pre-stress to that of circumferential prestress to reduce or annul the compressive stresses normally appearing as a result of the absence of expansion-compensating means. This partial compensation of the expansion will be particularly useful when the pressure is removed; in practice the tube remains hot for some time while the Poisson effect due to the pressure disappears.

It is thus possible with complete safety to bury such a conduit for the whole of its length, which constitutes a very important saving in the cost of civil engineering.

FIG. 1 and FIG. 2 illustrate by way of example, such a construction. The tube 1 is surrounded by thermal insulation 2 allowing thermal losses to be reduced. The insulants employed are generally fragile or not damp-resistant. It is suitable to make use of an insulant that is impervious and is resistant to compression. It has been found, for example, that thermal insulation with a rockwool base surrounded by a polyester sheath 21 may be made completely watertight and can withstand external forces due to the burial of the tube in the earth. If, however, there is a risk of the sheath 21 not being strong enough, the assembly may be enclosed in a concrete surround 3.

Generally, the tube will be constructed in separate lengths on which the thermal insulation will be placed. This will terminate at a certain distance from the end of each length, as is shown in FIG. 1, to allow the tube 1 to be welded to the next tube.

After the welding has been carried out, the insulating layer will be completed by a thermal insulator element 20 covered by a protective sheath 22 ensuring sealing at the position of the joint.

The sheath 21, insulated by the thermal insulation, is in practice subjected to only a slight increase in temperature. As a result, and thanks to the abolition of expansion joints, it is possible to cover the assembly with a protective coating of mortar, gussite or lightly reinforced concrete or any other coating increasing resistance to compression of the conduit, such as a double sheath into which material is injected or in which air or inert gas circulates. Deterioration of the thermal insulation is thus prevented and it is possible to backfill the trench in which the conduit has been placed.

As it is not possible, however, to avoid a certain loss of heat through the thermal insulation and as the backfill ensures a certain insulation of the conduit, higher or lower in accordance with the nature of the soil, a certain heating of the outer concrete covering must arise in the long term. This covering will therefore be formed by sleeves separated by spaces 31 permitting expansion. Watertightness may be assured in an efficacious manner by conventional joints 32.

Thus the expansion joints that in known arrangements are placed in the inner tube subject to great increase in temperature and a working pressure of the order of 5–10 bars are wholly abolished and it is only necessary to use normal joints placed on a concrete sleeve, of which the working temperature will not exceed 70° C and which is not subject to the working pressure; it is not necessary to provide access to these joints and the conduit may therefore be completely buried.

If it is desired further to improve the watertightness of the assembly, the presence of the expansion joints is no bar to the application of a coating of bitumen over the concrete sleeve 3.

It is seen that a conduit thus constructed requires only the excavation of a trench of a size little different from the diameter of the conduit with its thermal insulation.

The simplification of the civil engineering works resulting from the use of the invention is thus clearly apparent. It must, however, be noted that the "INVAR" or other low-expansion materials used are much more costly than normal steels commonly used for the construction of conduits, and even than stainless steel.

This, no doubt, is why the idea of constructing conduits of so costly an alloy has not hitherto been proposed for applications such as urban heating where it seems quite natural to use normal steel to construct conduits of quite large diameter for the conveyance of slightly corrosive fluid such as superheated water or steam at a temperature which is not excessive because it does not normally exceed 250° C.

However, for some time now the use of alloys of low thermal expansion has developed so far that sheets of "INVAR", for example, are available under very advantageous conditions and especially with a thickness of 3 mm, which corresponds exactly to the working pressures reached in urban heating, particularly if the conduit is reinforced.

Now it has been computed that the increased cost due to the use of deformable parts and the use of gantries allowing the displacement of the conduits was in fact higher than the price difference resulting from the use of an "INVAR" type alloy in place of ordinary steel.

This advantage is quite decisive in urban locations where the installation of urban heating by prior art methods cannot even be considered because of the considerable civil engineering works which would be required.

It should be noted that the choice of the material forming the tube and its dimensions must be made so that the stresses due to increase in temperature remain within allowable limits. This condition may be verified by means of conventional computations, certain results of which are given below.

In the computation the effect on the length of the conduit resulting from the effects of reinforcement of expansion, of the working pressure and of possible longitudinal prestressing must be taken into account as well as external forces and especially the effect of back-filling and the part played by the coating of concrete or mortar.

In what follows the following symbols will be used:

$C_{o1t}$ = hoop stress on the inner wall at the working temperature $t$, $C_{o2t}$ = hoop stress on the outer wall of the wrapping at the working temperature $t$, $C_{o10}$ = hoop stress on the inner wall at the temperature of application of the wrapping, $C_{o20}$ = hoop stress on the outer wall at the temperature of application, $C_{p1t}$ = hoop stress on the inner wall at temperature $t$ and working pressure P, $C_{p2t}$ = hoop stress on the outer wall at temperature $t$ and working pressure P, $C_{oLt}$ = longitudinal stress on the inner wall at temperature $t$ and with no pressure, $C_{pLt}$ = longitudinal stress on the inner wall at working pressure P and temperature $t$, $e_1$ = thickness of inner wall,
$e_2$ = thickness of outer wall,
$E_1$ = modulus of elasticity of inner wall,
$E_2$ = modulus of elasticity of outer wall,
$k = E_1/E_2$,
$\alpha_1$ = mean coefficient of thermal expansion of the inner wall between the temperature of installation and temperature $t$,
$\alpha_2$ = mean coefficient of thermal expansion of the outer wall between the temperature of installation and temperature $t$,
P = working pressure,
R = radius of tube,
$\gamma$ = Poissons ratio for the two metals (=0.3),
$t_o$ = application temperature,
$t$ = working temperature,
$\Delta_t = t_o - t$.

Then for relatively thin walls $$C_{o1t} = C_{o10} - \frac{E_1 \Delta t\, e_2}{e_2 + k\, e_1}\left((\alpha_2 - \alpha_1)(1 + \frac{v^2 e_2}{e_2 + k\, e_1}) - v\alpha_1\right) \quad (1)$$

$$C_{o2t} = C_{o20} + \frac{E_1 \Delta t\, e_1}{e_2 = k\, e_1}\left((\alpha_2 - \alpha_1)(1 + \frac{v^2 e_2}{e_2 + k\, e_1}) - v\alpha_1\right) \quad (2)$$

$$C_{oLt} = E_1 t\left(\alpha_1 - \frac{(\alpha_2 - \alpha_1) e_2}{e_2 + k\, e_1}\right) \quad (3)$$

$$C_{p1t} = C_{o1t} + \frac{PRk}{e_2 + k\, e_1}\left(1 + \frac{v^2 e_2}{e_2 + k\, e_1}\right) \quad (4)$$

$$C_{p2t} = C_{o2t} + \frac{PR}{e_1 + k\, e_1}\left(1 + \frac{v^2 e_1 k}{e_2 + k\, e_1}\right) \quad (5)$$

$$C_{pLt} = C_{oLt} + \frac{PRk}{e_2 + k\, e_1} \quad (6)$$

It is seen that by applying the preceding equations it is possible to compute the hoop stress $C_{o20}$ that should be applied to the outer wrapping at the temperature of application to obtain the desired hoop stress $C_{p1t}$ in the inner tube at the working temperature and pressure.

Thus in the following example: Tube of diameter 400 mm at a working pressure of 40 bars, where:

$e_1 = 3$ mm
$e_2 = 0.9$ mm
$E_1 = 20.500$ daN/mm² at 20° C and 20.500 daN/mm² at 200° C
$E_2 = 14.100$ daN/mm² at 20° C and 14.700 daN/mm² at 200° C
$\alpha_1 = 3 \times 10^{-6}$
$\alpha_2 = 13 \times 10^{-6}$
$t_o = 20°$ C
$t = 200°$ C it is found that the following stresses (in daN/mm²) are developed:

$C_{o10} = -14$
$C_{o20} = 46.66$
$C_{p1t} = 7.142$
$C_{o1t} = -6.195$
$C_{oLt} = -5.60$
$C_{pLt} = 8.9$
$C_{o2t} = 36.87$
$C_{p2t} = 51.547$

It is found that at working pressure and temperature the stress in the wrapping has diminished because of the greater expansion of the envelope and its different modulus of elasticity and that the longitudinal stress is reduced or increased in accordance with the possible longitudinal prestressing established during installation of the conduit.

On the other hand the thickness of the inner tube 11 is one half of that which would be necessary for an unwrapped tube.

It is seen that the inner tube undergoes a compressive stress $C_{oLt} = 5.6$ daN/mm² when hot with no internal pressure, as there is no advantage from the shortening effect due to its being put under pressure. However, this is not disadvantageous in normal use because the increase in temperature is accompanied by the increase in pressure. However, this stress must be taken into account, because when the steam pressure is removed the tube will remain hot for quite a long time. Normally, such a compressive stress can be withstood without risk of buckling. However, if it is wished completely to remove the compressive stress from the inner tube, it is possible as indicated above, to apply a longitudinal tensile prestress at the temperature of installation.

If this longitudinal tensile stress at zero pressure and installation temperature is termed $C_{oLo}$, the hoop prestress on wrapping of the inner tube and of the reinforcement become respectively $$C'_{o10} = C_{o10} + \frac{VC_{oLo}e_2}{e_2 + e_1}$$

$$C'_{o20} = C_{o20} - \frac{idVC_{oLo}e_1}{e_2 + e_1}$$

Taking this prestressing into account, the previous equations (1) to (6) become:

$$C'_{o1t} = C_{o1t} + \frac{vC_{o10}e_2}{e_2 + k e_1} - \tag{1'}$$

-continued $$\frac{E_1 \Delta t \, e_2}{e_2 + k e_1}\left((\alpha_2 - \alpha_1)(1 + \frac{v^2 e_2}{e_2 + k e_1}) - v\alpha\right)$$

$$C'_{o2t} = C_{o20} - \frac{vC_{oLO}e_1}{e_2 + k e_1} + \tag{2'}$$

$$\frac{E_1 \Delta t \, e_2}{e_2 + k e_1}\left((\alpha_2 - \alpha_1)(1 + \frac{v^2 e_2}{e_2 + k e_1}) - v\alpha\right)$$

$$C'_{oLt} = E_1 t\left(\alpha_1 - \frac{(\alpha_2 - \alpha_1)e_2}{e_2 + k e_1}\right) + C_{oLO} \tag{3'}$$

$$C'_{p1t} = C'_{o1t} + \frac{PRK}{e_2 + k e_1}\left(1 + \frac{v^2 e_2}{e_2 + k e_1}\right) \tag{4'}$$

$$C'_{p20} = C'_{o2t} + \frac{PRK}{e_e + k e_1}\left(1 + \frac{v^2 e_2}{e_2 + k e_1}\right) \tag{5'}$$

$$C'_{pL} = C'_{oL} + \frac{PRK}{e_2 + k e_1} \tag{6'}$$

Thus if, in the previous example, a longitudinal prestress $C_{oLO} = 5.6$ daN/mm² is applied to the inner tube at the time of installation the longitudinal compression when hot and under pressure is zero;
the longitudinal tension when hot and under pressure is 14.5 daN/mm²;
the hoop stress $C'_{p10}$ is 7.582 daN/mm²;
the hoop stress $C'_{p20}$ is 52.707 daN/mm²;

The risk of buckling of the tube has thus been eliminated in all circumstances.

One of the objects of the invention being to be able completely to back-fill the conduit, dispensing with maintenance costs, it is necessary to have absolute reliance on the tightness of the conduit and particularly of the welds. As it is not possible to weld together the reinforcing wrappings, which must be able to expand, it has been shown at 110 in FIG. 3, that the ends of the tubes extend slightly beyond the reinforcing wrappings 12 so as to allow welding of the tubes. In some cases it will be advisable, after welding, to effect a reinforcement of the welded part by means of a ring 13 extending across the weld, the edges of the ring bearing directly on the two ends 110 of the abutted tubes 11. Such an arrangement is described in detail in French patent application No. 74-06402 filed on 26 Feb. 1974 and published under the No. 2,228,189.

After the construction of the reinforced tube it is possible to surround it by a thermal insulator 2, as has been previously described, and then by a resistant coating 3 and to back-fill the assembly.

In another manner of construction, represented in FIG. 4, the thermal insulation is interposed between the inner tube 11 and the reinforcing wrapping 12. It should be noted that in this case it is necessary to use a thermal insulant that is resistant to compression while retaining good thermal insulation properties. A certain compression of the insulation may be allowed, it only being necessary to take this into consideration when computing the prestressing of the reinforcement.

In this case it is not necessary to use watertight thermal insulation, provided that the binding wrapping 12 is constructed in a manner ensuring good sealing against water or damp. The same binding wrapping may play the part of protective sheath and replace the concrete coating 3. It will be noted that the wrapping 12, insulated by the thermal insulation, will be subjected to only slight expansion.

The construction of a conduit including thermal insulation interposed between an inner tube and the outer binding wrapping is described in more detail in French patent application No. 73-16099 filed on May 4, 1973 and published under the No. 2,262,246. As is shown in that document, the compression of insulating material between the inner tube and the binding wrapping reduces the noise produced by the flow of fluid in the conduit. This advantage may be interesting in urban applications of the conduit described in the present specification.

So far, the present invention has been described with particular reference to a conduit of large diameter buried in a trench, and this is in fact the most important of its applications though other applications can be envisaged. For example, the reduction in weight due to the abolition of the means permitting thermal deformation may be valuable, especially in naval construction, for example the construction of submarine vessels.

On the other hand the use of expansion joints may have other disadvantages, especially if the fluid transported is aggressive or contaminated, for example in nuclear plants. The construction according to the invention of conduits of fixed length not comprising expansion means could therefore be advantageous in such applications.

It should be noted that the invention is not limited to the details of the embodiments and modifications that have been described above nor to the applications that have been specifically considered. Other applications may in fact be found. On the other hand, the use of "INVAR" type alloys is appropriate for temperatures of up to about 250° C. However, at other temperatures the invention may be carried into effect by using other alloys. It should be noted however, that the use of "INVAR" is particularly advantageous because this material is made in large quantities and because the difference in price as compared with normal steel is therefore not excessive, even through it is considerable.

As regards the thermal insulation, it has been mentioned that it must be formed of an insulating material suitable for the particular use which is made of it, in particular resistant to compression and preferably water-tight. A polyurethane foam could be used, or a rock-wool based insulant well suited to the transport of hot liquids.

If the thermal insulant is not itself waterproof and sufficiently resistant, it must be covered by a water tight protective envelope which may be a metal tube or a moulded concrete or adhesive cement, a polyester or vinyl coating, a watertight wrapping of mutually adhesed tapes or some other arrangement applied directly in layers. It will be noted that the abolition of expansion joints facilitates the application of the protective sheath.

We claim:

1. In a method of manufacturing a conduit for conveying a fluid at a temperature and pressure substantially higher than ambient temperature and pressure, said conduit comprising an inner tube of a material having a low thermal expansion and surrounded by thermal insulation, said tube having a high working temperature when conveying said fluid, the improvement comprising the steps of:
    (a) forming said inner tube without expansioncompensating means;
    (b) applying about said inner tube, at an installation temperature lower than said working temperature, a wrapping of a binding material whereby expansion of said inner tube in response to said fluid pressure is resisted by binding force of said wrapping, said binding material having a thermal expansion greater than that of said inner tube;
    (c) anchoring the ends of said tube at said installation temperature; and
    (d) prestressing said wrapping at said installation temperature whereby to compensate the reduction in said binding force at said working temperature resulting from the different thermal expansions of said tube and said wrapping, said prestressing producing elastic elongation of said inner tube, whereby at least in part of compensate compressive stress in said inner tube at said working temperature resulting from the longitudinal thermal expansion of said anchored inner tube.

2. The method claimed in claim 1 and further including the steps of:
    (e) after anchoring one end of said inner tube and before anchoring the other end thereof, applying to said inner tube a longitudinal tensile stress producing elastic elongation thereof additional to that due to said prestressing of said wrapping whereby in further to compensate said compressive stress.

* * * * *